United States Patent [19]
Stewart

[11] Patent Number: 5,422,558
[45] Date of Patent: Jun. 6, 1995

[54] MULTICELL BATTERY POWER SYSTEM

[75] Inventor: Neal G. Stewart, Kowloon, Hong Kong

[73] Assignee: Astec International Ltd., Hong Kong, Hong Kong

[21] Appl. No.: 58,156

[22] Filed: May 5, 1993

[51] Int. Cl.[6] .......................................... H01M 10/44
[52] U.S. Cl. .......................................... 320/7; 320/5; 320/14; 320/21
[58] Field of Search .................. 320/6, 17, 18, 15, 14, 320/5, 7, 21

[56] References Cited
U.S. PATENT DOCUMENTS

| | | |
|---|---|---|
| 3,778,634 | 12/1973 | Hanrihan . |
| 4,061,955 | 12/1977 | Thomas et al. .................. 320/18 X |
| 4,143,283 | 3/1979 | Graf et al. . |
| 4,672,228 | 6/1987 | Swoboda . |
| 4,673,826 | 6/1987 | Masson . |
| 4,694,194 | 9/1987 | Hansel et al. . |
| 4,709,202 | 11/1987 | Koenck et al. . |
| 4,760,322 | 7/1988 | Crampton . |
| 4,871,956 | 10/1989 | Barrella .......................... 320/18 X |
| 4,876,495 | 10/1989 | Palanisamy et al. ............. 320/18 |
| 5,103,156 | 4/1992 | Jones et al. ..................... 320/35 |
| 5,151,644 | 9/1992 | Pearson et al. ................. 320/14 |
| 5,153,496 | 10/1992 | LaForge .......................... 320/18 X |
| 5,168,206 | 12/1992 | Jones ............................... 320/14 X |
| 5,243,269 | 9/1993 | Katayama et al. .............. 320/14 |

Primary Examiner—Steven L. Stephan
Assistant Examiner—Nicholas Ponomarenko
Attorney, Agent, or Firm—Coudert Brothers

[57] ABSTRACT

A multicell battery power system for providing power to a load is disclosed. The battery power system includes a plurality of battery modules and power bus for transmitting power between the battery modules and the primary load. Each of the battery modules includes a battery for providing electrical power and connection circuitry for connecting the battery to the power bus. The battery modules each include circuitry for monitoring the power output and status of the battery means. Each battery module also includes a programmable battery controller for controlling the operation of the battery and the connection circuitry. The battery controller is programmably responsive to the power monitoring circuitry, and in an illustrated embodiment is also be responsive to a system power controller or to one or more other battery modules. A battery charger may also be included in each module to provide programmably controlled individual recharging of batteries by module.

18 Claims, 4 Drawing Sheets

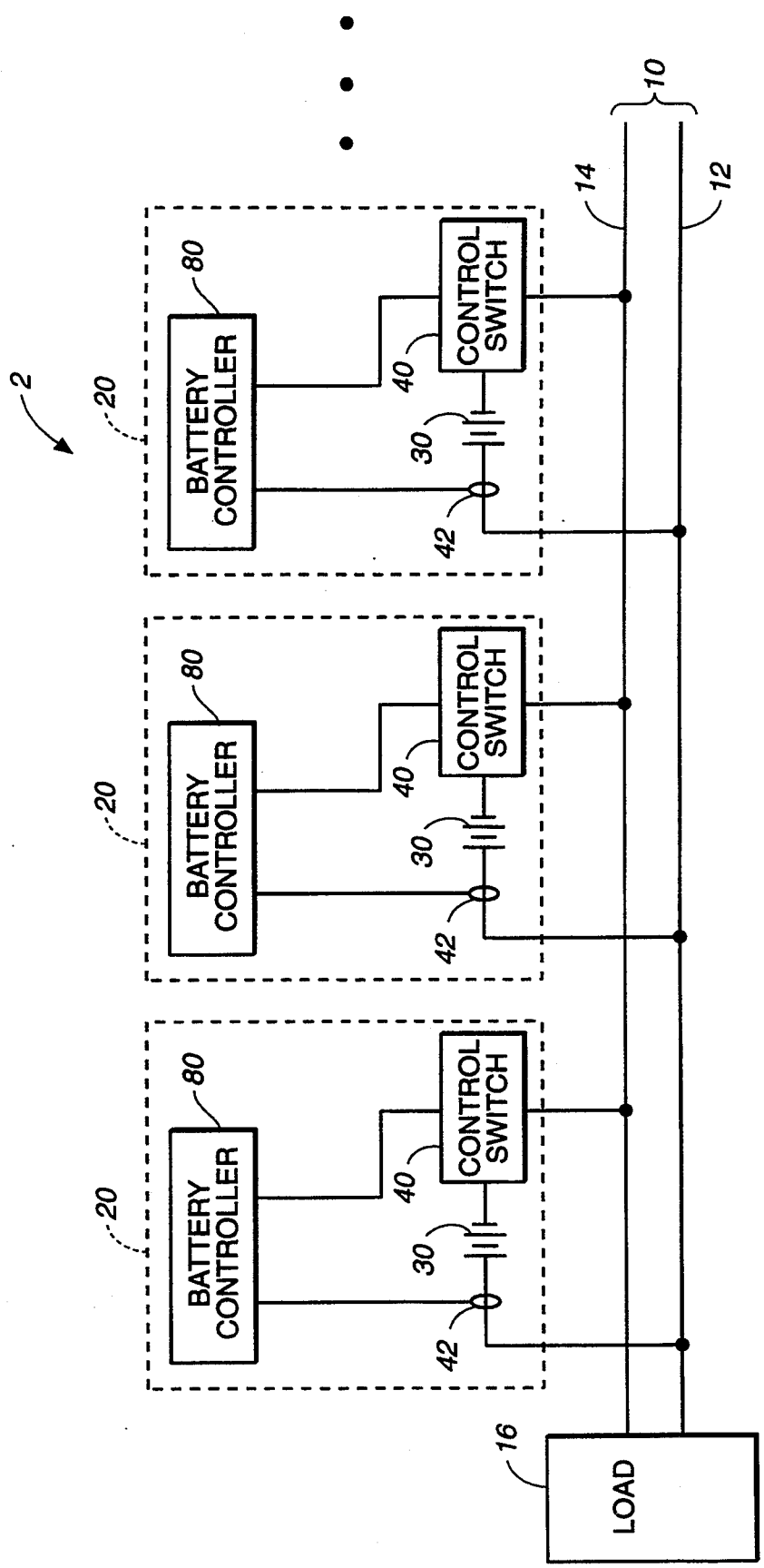
FIG._1

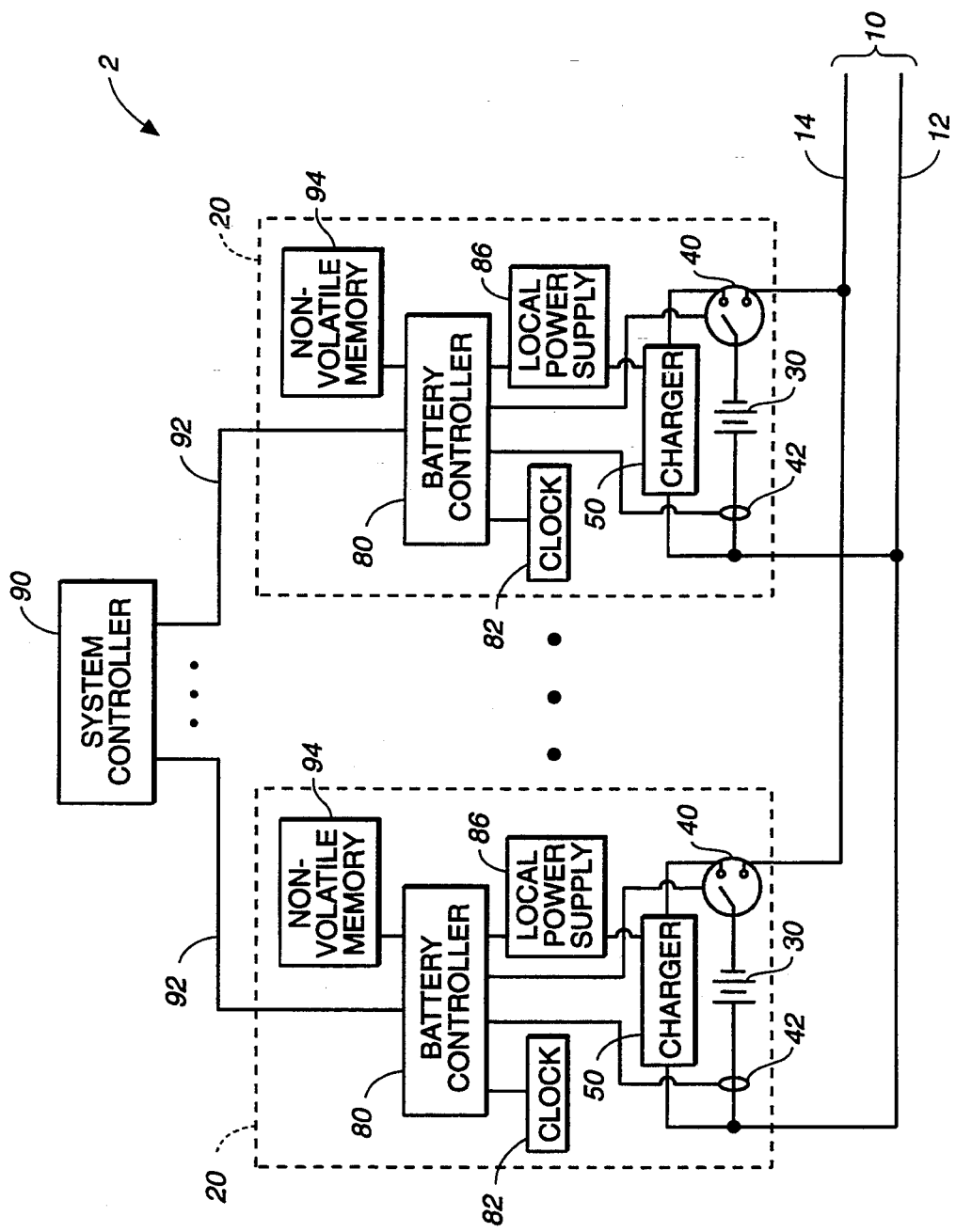
FIG._2

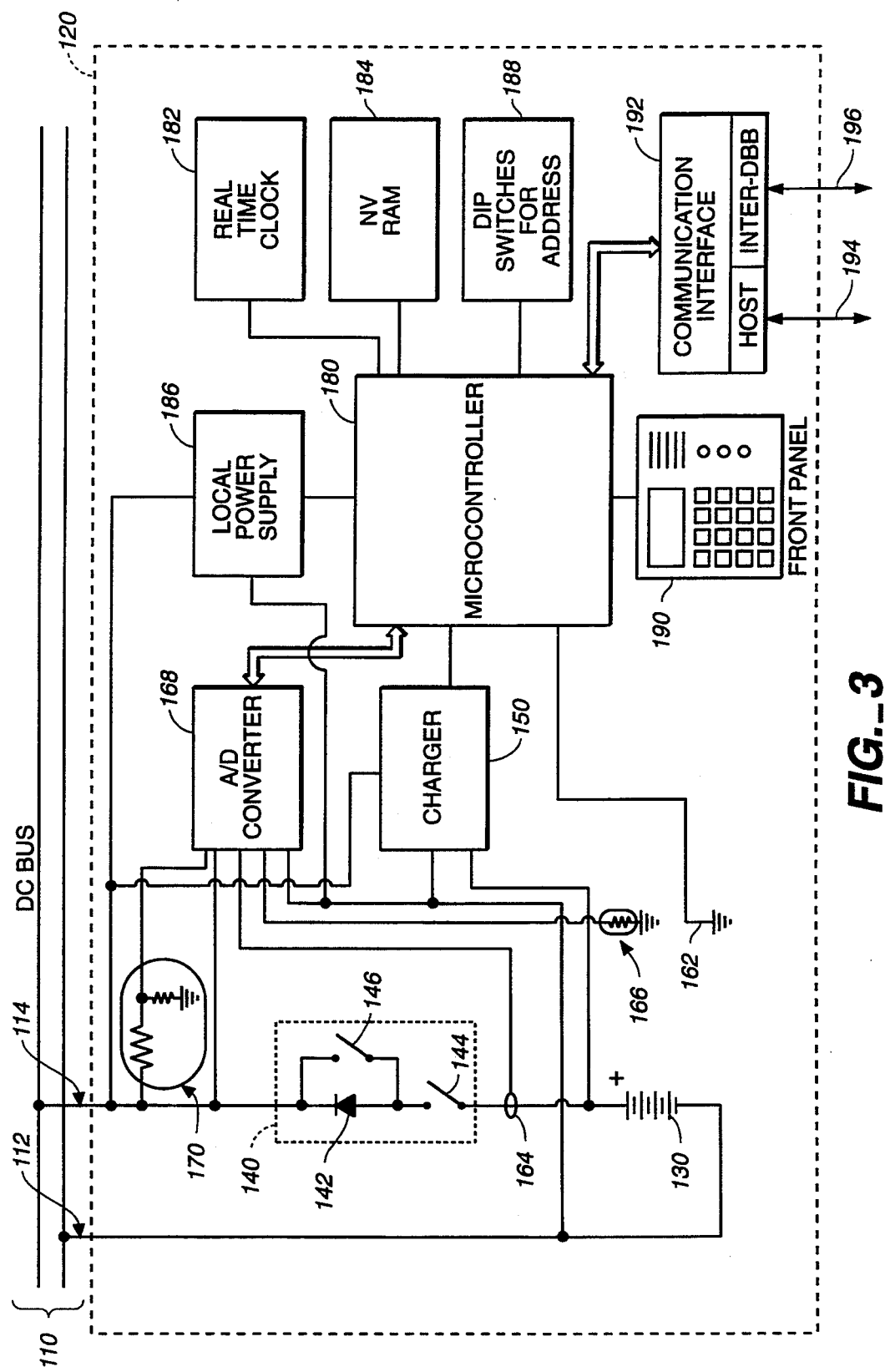
FIG._3

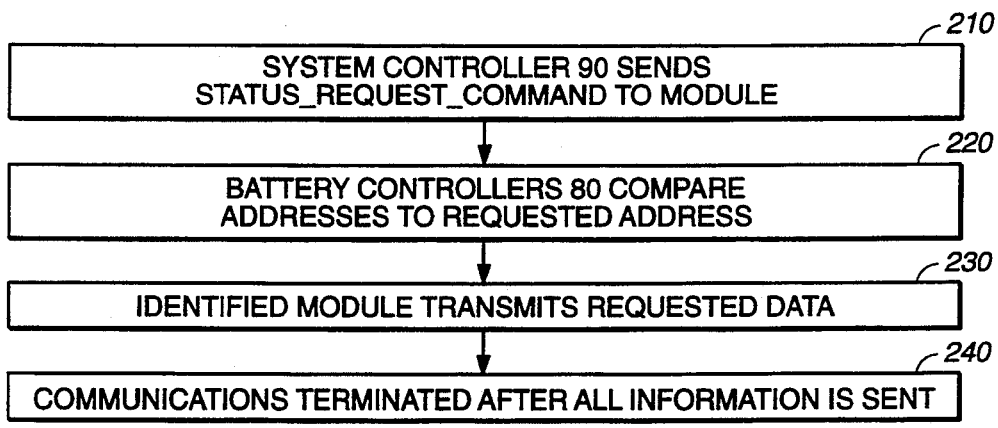
FIG._4
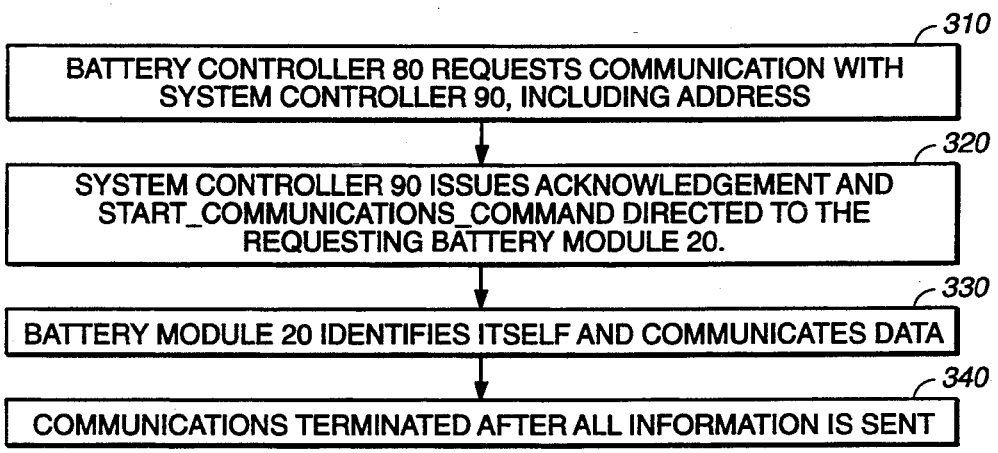
FIG._5
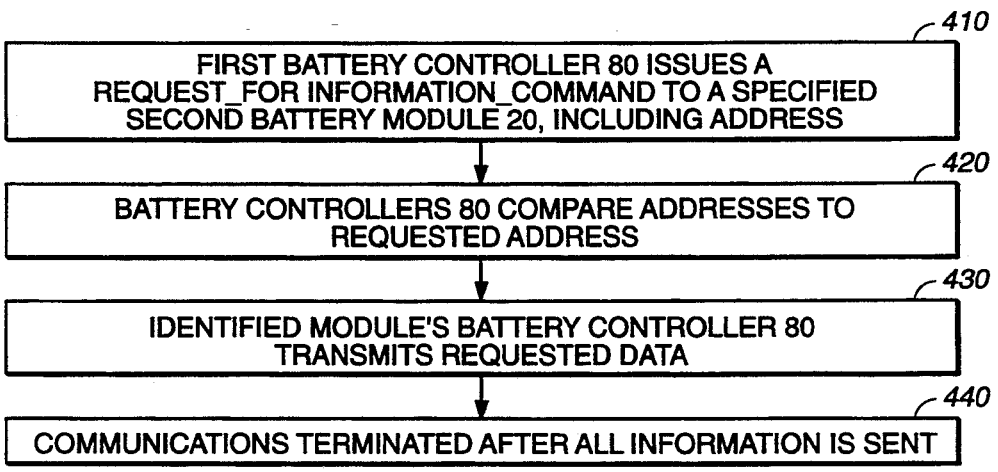
FIG._6

MULTICELL BATTERY POWER SYSTEM

FIELD OF THE INVENTION

The present invention relates generally to the field of supplying power to an electrical load device, and more particularly to a multicell battery power system for supplying such power.

BACKGROUND OF THE INVENTION

All electronic devices require some apparatus for providing the electrical power necessary to operate the devices. One approach to providing such power is to incorporate a battery power system into the device. Such a battery power system would be desirable in systems where use of an AC power system is impractical, or as a backup to an AC power system to maintain power in case of an AC power failure.

The battery power system may be required to supply significant power to the load device. One method of increasing power to the load device is to utilize several separate batteries in parallel. The addition of multiple batteries into the system complicates the design of the system, as each battery would likely have different charging, lifetime and other performance characteristics. These variations between different batteries and their associated electronics complicate correctly matching the performance characteristics of all of the batteries in the system to the system's need, and make it difficult to accurately predict their future behavior. The system designer or the end user would be required to consider these characteristics on a battery-by-battery basis.

Also, loads often have different power needs under different conditions or at different times. It would therefore be desirable to be able to customize the battery power characteristics to the power needs of the system. For example, it might be desirable to have low power but fast recharging batteries compensate for minor changes in power to the load during unusually heavy activity while leaving higher power, slower recharging batteries available for primary power use. Prior art battery power supplies can modify their power outputs in response to changes in the power drawn by the load, but cannot selectively activate specific batteries to respond to specific changes in load power needs.

It would therefore be desirable to develop a battery power system wherein the battery management electronics is modular in nature. Such a battery power system would include a plurality of battery modules wherein each module would be independently able to monitor and control its own functioning so that the user need not consider the condition or characteristics of each individual battery module when incorporating them into the system.

In addition, each battery module should function to alert the user to any malfunctions. Ideally, the battery power system would record the status of the individual battery modules to assist in diagnosis of problems with the battery modules. It would also be desirable for the individual battery modules to automatically recharge themselves as needed.

The individual battery modules should further be capable of monitoring the power needs of the load to determine whether they should be operative to supply power to the load. In addition, an optional central controller could be provided to communicate with the individual battery modules to provide commands to update the individual modules' programming. The individual battery modules would preferably also be able to communicate with the central controller to provide, for example, data regarding the battery charge status, temperature, output current demand, and other relevant performance characteristics. An ideal modular battery power system would then be capable of directing distinct battery modules to function differently under specified circumstances to best match the power needs of the load.

Accordingly, it is an object of the present invention to provide an improved multicell battery power supply.

Another object of the present invention is to provide a multicell battery power supply which is modular and contains separate battery modules each containing essential control and monitoring circuitry to control its own functioning based upon internal conditions to the battery module as well as the conditions of the overall power supply.

A further object of the present invention is to provide a multicell battery power supply which can regulate power output in response to the power needs of the load.

A still further object of the present invention is to provide a multicell battery power supply which automatically recharges individual batteries based upon predetermined time or battery power level conditions.

Yet another object of the present invention is to provide a multicell battery power supply which alerts the user to malfunctions in individual battery modules.

A still further object of the present invention is to provide a multicell battery power supply which records status information related to the functionality of the battery modules or of the condition of the overall system power output.

An additional object of the present invention is to provide a modular multicell battery power supply wherein a central controller communicates directly with individual battery modules.

These and other objects of the present invention will become apparent to those skilled in the art from the following description and accompanying claims and drawings.

SUMMARY OF THE INVENTION

The present invention comprises a multicell battery power system for providing power to a load. The battery power system includes a plurality of battery modules and power bus means for transmitting power between the battery modules and the primary load. Each of the battery modules includes a battery means for providing electrical power and connection means for connecting the battery means to the power bus means. The battery modules each include battery power monitoring means for monitoring the power output and status of the battery means. Each battery module includes programmable battery control means for controlling the operation of the battery means and the connection means. The battery control means is programmably responsive to the power monitoring means. In alternative embodiments, the battery control mean could also be responsive to a system power control means or to one or more other battery modules.

In one preferred embodiment of the present invention, the battery power system further includes battery charging means within each battery module for recharging the battery or batteries in such module. The charging means is responsive to the battery control means. Each battery module may further include secondary power means for powering each of the battery control means.

In another embodiment of the present invention the battery power system further includes control communications means for communicating data for controlling the power of the battery power system between the optional system power control means and each module's battery control means, or between the individual control means without the intervention of a central controller. Also, in a preferred embodiment of the present invention, each battery control means comprises a separate microprocessor means.

The multicell battery power system can incorporate different features related to the status of the battery modules. In one embodiment, the multicell battery power system further includes storage means for storing status information obtained from each battery power monitoring means. In another embodiment, the multicell battery power system also includes real-time clock means for generating timing signals associated with each battery module. This embodiment may include alert means for generating an alert signal if that module's power control means determines from the timing signals that maintenance of said battery module should be performed.

BRIEF DESCRIPTION OF THE DRAWINGS

FIG. 1 is a block diagram of a preferred embodiment of the present invention.

FIG. 2 is a more detailed view of the preferred embodiment of FIG. 1.

FIG. 3 is a block diagram of a preferred implementation of the battery module 20 of FIGS. 1 and 2.

FIG. 4 is a flowchart for battery controller 80 executing a status request command from system controller 90 of FIG. 2.

FIG. 5 is a flowchart for initiation of communication by battery controller 80 with system controller 90 of FIG. 2.

FIG. 6 is a flowchart for initiation of communication by a first battery controller 80 with a second battery controller 80 of FIG. 2.

DETAILED DESCRIPTION OF THE INVENTION

A preferred embodiment of the present invention is illustrated in FIG. 1. A plurality of battery modules 20 (three are shown) are connected to common output voltage lines 12 and 14, which together comprise a DC power bus 10. DC power bus 10 serves as a power connection means for transmitting power between the battery modules 20 and the primary load 16 for the system.

Each battery module 20 has a battery 30 for providing electrical power. Batteries 30 may be of any type of battery, examples of which include lead acid, nickel cadmium, and nickel metal hydride. Batteries 30 may, in some embodiments, be removable for replacement.

Each battery module 20 also includes a cell connection switch 40 placed in series with battery 30 to provide means to either disconnect or connect battery 30 to DC power bus 10. Disconnection of battery 30 from DC power bus 10 may be required in order to perform self-testing, maintenance or charging of battery 30.

Central to the functionality of each battery module 20 is a programmable battery controller 80 which controls the operation of the battery module. Battery controller 80 controls cell connection switch 40, thereby controlling connection of the battery to DC power bus 10. Battery controller 80 partially relies upon the outputs of sensors 42 to determine when such connections are to be made. Sensors 42 are discussed in further detail below. Battery controller 80 may be either powered directly from battery 30, DC power bus 10, or from a separate secondary power supply, such as a separate, small battery, as discussed below.

A more detailed block diagram of a preferred embodiment of the present invention is shown in FIG. 2. Elements which are common to FIGS. 1 and 2 share common numerals. Again, a plurality of battery modules 20 are connected to common output voltage lines 12 and 14, which comprise a DC power bus 10. Each battery module 20 again has a battery 30 for providing electrical power and a cell connection switch 40 placed in series with battery 30 to provide means to either disconnect or connect battery 30 to DC power bus 10. A battery controller 80 within each battery module 20 controls the operation of cell disconnect switch 40 and a charger 50, as discussed below.

FIG. 2 illustrates several optional features not shown in FIG. 1. First, as discussed above, included in each battery module 20 is a battery monitoring sensor 42 for monitoring the power output and status of its associated battery 30. Sensor 42 is preferably a DC level sensor 42. However, a variety of sensing circuits may be used. These sensors may detect a number of important parameters related to the operation of a battery module 20, including battery temperature, ambient temperature, electrolyte concentration and level, internal battery pressure, physical leakage, and corrosive or hazardous gas sensing. The sensed data may be stored to a permanent storage means 94 in the battery module 20. The stored data may later be used for diagnostic purposes and to determine causes of power failure.

Charging of battery 30 may be performed by an optional battery charger 50, which would be powered by the DC power bus 10. Many alternative embodiments of charger 50 are obvious to persons of ordinary skill in the art, including linear or switch mode chargers. Selection of a specific type of charger will depend on the needs of the particular battery 30. Charger 50 is disposed in parallel with battery 30, to allow recharging of battery 30 while the battery 30 is disconnected from the DC distributed bus 10. The power for recharging is drawn directly from the DC power bus 10.

Battery controller 80 could also be connected to a local power supply 86 and to a real-time clock 82. These options are described below in connection with a more specific embodiment of battery module 20.

A system power controller 90 could be provided in the system which would be in connection with the battery controllers 80 of the battery modules 20. Battery controllers 80 could then be responsive to commands from system power controller 90, thereby allowing system controller 90 to control the operation of the multicell battery power system. In this embodiment battery controller 80 would be provided with a communication interface 92 which could allow bi-directional communication either with system controller 90, or optionally with other battery modules 20. Bi-directional communication would allow sensed data to be transmitted directly to system controller 90 in addition to allowing receipt by the battery controller 80 of control and programming signals from the system controller 90 or one or more other battery modules 20.

In a preferred embodiment of the present invention, battery controller 80 is implemented using a programmable microprocessor in a manner known to those of ordinary skill in the art. With the use of a microprocessor, battery controller 80 enables a simple implementation of direct communication with optional system power controller 90 in a conventional manner. System controller 90 would then be able to directly control criteria for the connection of battery 30 to DC power bus 10 or for recharging battery 50. Alternatively, system controls 90 could just receive data from the battery modules 20 regarding module status.

Thus, the inclusion of battery controller 80 as a programmable controller with a variety of data and control inputs provides great flexibility in the operation of the battery module 20. Battery connection to DC power bus 10 can therefore occur rapidly and as needed. Recharging and maintenance of battery module 20 may be performed as needed or at specified time intervals utilizing timing signals from real time clock 82, with little input required from the user. An inactive or inoperative battery module 20 may provide warnings either to system controller 90, or directly to the user through a front panel to alert the user to the problem. In addition, a variety of hazardous conditions or malfunctions can be detected early and system controller 90 or the user alerted so that the effect of such adverse conditions can be reduced and catastrophic loss of power avoided.

Such a modular battery module 20 has the significant advantage that it may be easily introduced into a multi-cell battery DC power system 2 as needed, with additional battery modules 20 being seemlessly plugged into the overall power system whenever the power needs of the DC power system 2 change.

A preferred embodiment of battery module 20 is illustrated in greater detail in the block diagram shown in FIG. 3. DC power is provided by a battery module 120 connectable between power lines 112 and 114, power lines 112 and 114 comprising a DC power bus 110. Specifically, between power lines 112 and 114 are a battery 130 and a cell disconnect switch circuit 140 disposed in series. Cell disconnect switch circuit 140 is operative to selectively connect and disconnect battery 130 from DC power bus 110.

Cell disconnect switch 140 ideally should include a combination of mechanical and electrical switching elements designed to maintain the lowest ohmic loss with the highest changeover speed. Cell disconnect switch circuit 140 includes two digitally controllable switches, which may be two relay contacts. In the illustrated embodiment, the first switch, switch 144, serves as a main power switch for the battery module 120. A second digitally controlled switch 146 is also provided. When closed, battery 130 is in direct connection to DC power bus 110. When switch 146 is open, battery 130 is in series with a diode 142. This allows for direct low loss switching, while allowing the diode to provide a fast, temporary way of transmitting power before the switch 144 can close.

Battery module 120 also includes a charger 150 disposed across battery 130. As stated above, charger 150 may be of a variety of configurations, including linear or switch mode, and the charging method can be of any of a variety of methods including constant current or constant voltage. Either slow or quick charging may also be accommodated.

In addition, battery module 120 includes a variety of sensing circuits. These sensors may detect a number of important parameters related to the operation of the battery module, as described above. Digital sensors 162 may be connected directly to the battery controller 180. Analog sensors 166 are connected to an analog to digital converter 168, which is in turn connected to battery controller 180. In addition, a DC level sensor 164 may also be connected to analog to digital converter 168 to provide information regarding the DC power level being provided by battery 130. Also, a power bus sensor 170 may also be connected to analog to digital converter 168 to provide information regarding the present level of power across the DC power bus 110.

As described above, the functioning of battery module 120 is controlled by a battery controller 180. Battery controller 180 is preferably programmable, and in one preferred embodiment comprises a programmable microprocessor. Battery controller 180 receives information sensed by DC power bus sensor 170 and battery sensors 162, 164, and 166, and may make decisions regarding connection of battery 130 to the DC power bus 110 in operation of charger 150 based upon the sensed data. In addition, the sensed data may be stored to a permanent storage means, such as a non-volatile RAM 184. The stored data may later be used for diagnostic purposes and to determine causes of power failure.

Battery controller 180 may be provided with a local power supply 186 to provide power to battery controller 180. Local power supply 186 may draw power either from the DC power bus 110 or from battery 130. Provision of multiple power sources helps ensure that all record tracking activities may be properly completed in the case of a serious system power failure.

Battery controller 180 may be programmed in a variety of manners. Battery controller 180 is provided with a communication interface 192 which may communicate either with the system controller 90 of FIG. 2 or with other battery modules 120. Each battery module 120 require some form of identification in order to communicate with system controller 90 of FIG. 2 or with other battery modules 120. Therefore each battery module may be assigned an address, either directly by the system controller 90 or by DIP switches 188 associated with battery controller 180. Also, a panel 190 may be provided to allow a user to directly program and control battery controller 180.

Also, battery module 120 may include a real time clock 182. Real time clock 182 enables timing signals to be provided, which would allow battery controller 180 to make diagnostic or recharging decisions at either predetermined times or after a predetermined period of time has elapsed. In addition, these timing signals would allow sensed data to be time stamped when saved, so that recorded sensed data may be more meaningfully interpreted.

As discussed above, battery controllers 80 and system controller 90 of FIG. 2 may communicate with one another to exchange sensed data and commands. Several exemplary procedures performing such communications are illustrated in FIGS. 4-6, and are discussed below. Other alternative and additional procedures will be obvious to those skilled in the art and are included herein to illustrate the advantages of the present invention.

System controller 90 may request status information from any one of the battery controllers 80. FIG. 4 is a flowchart for a sequence in which a battery controller 80 responds to such a STATUS_REQUEST_COMMAND from system controller 90. First, system controller 90 issues a request command for status from a specified battery controller 80, as shown at 210. The request command would include the identification address value for the desired module, as described above. The STATUS_REQUEST_COMMAND may include one or more of the following self-descriptive commands:

Request_for_Temperature_Status
Request_for_Battery_Level
Request_for_Charging
Request_for_Maintenance
Request_for_Diagnosis_Report
Request_for_Power_Failure_Record
Request_for_Self_Test_and_Data_Logging Next, each battery controller 80 compares its address to the requested address, as shown at 220. The target battery controller 80 then identifies itself and transmits the requested status information, as shown at 230. Finally, communications are terminated, as shown at 240.

Each battery controller 80 may also initiate communication with the system controller 90. FIG. 5 is a flowchart for initiation of communication by battery controller 80 with system controller 90 of FIG. 2. A battery controller 90 may initiate communication, for example, to relate status or warning/alert information. Examples of such messages include:

Connection/Disconnection of Battery 30 to DC Power Bus 10
Charging of Battery 30
Maintenance of Battery Module 20
Self Test and Data Logging
Warning/Malfunction Alerts:
  Inoperative Battery
  Over Temperature
  Over Current
  Corrosive or Hazardous Gas Detected
  Battery Leakage
  Low Battery Level
  Low Electrolyte Concentration and Level
  Charging Failure First, battery controller 80 issues a request command to provide status information to system controller 90, as shown at 310. The request command would include the identification address value for the desired module, as described above. Next, system controller 90 would send out an acknowledge signal and a START_COMMUNICATIONS_COMMAND directed to the appropriate battery module 20, as shown at 320. Next, the battery controller 80 of the identified battery module 20 would identify itself and send the appropriate data, as shown at 330. Finally, communications would be terminated, as shown at 340.

Each battery module 20 may be provided with communications circuitry to permit communication between battery modules 20 without requiring intermediate processing by a system controller 90. Such communications could allow a hierarchical protocol scheme to be introduced, based upon the address of each battery module 20, allowing battery modules 20 to serve as temporary system controllers. This could provide the advantages of a system controller 90 without the need for a separate device. Further, such a scheme would permit each battery controller 80 to serve as a backup system controller, with each battery controller 80 being available if the other battery controllers 80 failed.

FIG. 6 is a flowchart for a process of initiation of communication by a first battery controller 80 with a second battery controller 80. First, the first battery controller 80 performs a REQUEST_FOR_INFORMATION_COMMAND to a specified battery module 20, as shown at 410. The request command would include the identification address value for the desired module, as described above. Next, each battery controller 80 compares its address to the requested address, as shown at 420. The target battery controller 80 then identifies itself and transmits the requested status information, as shown at 430. Finally, communications are terminated, as shown at 440.

As these illustrative procedures show, the present invention provides great flexibility in communication and control of several battery modules 20 in a multicell battery power system. Other procedures will become obvious to those skilled in the art.

While specific preferred embodiments of the elements of the present invention have been illustrated above, various modifications of the invention in addition to those shown and described herein will become apparent to those skilled in the art from the foregoing description and accompanying drawings. Such modifications are intended to fall within the scope of the following claims.

What is claimed is:

1. A multicell battery power system for providing power to a load comprising:
   a plurality of battery modules; and
   power bus means for transmitting power between said battery modules and the load;
   wherein each said battery module comprises a battery means for providing electrical power, connection means for selectively coupling said battery means to the power bus means, battery power monitoring means for monitoring the power output and status of said battery means, and battery control means for controlling the operation of said battery means and said connection means, said battery control means being responsive to said battery power monitoring means.

2. The multicell battery power system of claim 1 further comprising a system power control means for controlling said battery modules, each of said battery control means being responsive to said system power control means.

3. The multicell battery power system of claim 1 wherein each said battery module further comprises secondary power means for powering each of said battery control means.

4. The multicell battery power system of claim 1 wherein said power monitoring means further obtains status information concerning the status of said battery means, said multicell battery power system further comprising storage means for storing said status information obtained from each said battery power monitoring means.

5. The multicell battery power system of claim 1 further comprising real-time clock means for generating timing signals associated with each battery module.

6. The multicell battery power system of claim 5 wherein each said battery module further comprises alert means for generating an alert signal if that module's power control means determines from said timing signals of said real-time clock means that maintenance of said battery module should be performed.

7. The multicell battery power system of claim 1 further comprising system power control means for controlling operation of said battery modules and control communications means for communicating data between the system power control means and each said battery control means, each said battery control means further including means for identifying said battery module.

8. A multicell battery power system for providing power to a load comprising:
   a plurality of battery modules;
   communications means for bi-directional communication between individual said battery modules, each said battery module including means for identifying said battery module and for communicating data with other said battery modules;
   power bus means for transmitting power between said battery modules and the load;
   wherein each said battery module comprises a battery means for providing electrical power, connection means for selectively coupling said battery means to the power bus means, battery power monitoring means for monitoring the power output and status of said battery means, and programmable battery control means for controlling the operation of said battery means and said connection means, said battery control means being responsive to said battery power monitoring means.

9. The multicell battery power system of claim 8 wherein the battery control means of one of said battery modules functions as a system power control means to control the other of said battery modules.

10. The multicell battery power system of claim 1 wherein each said battery control means comprises a microprocessor.

11. The multicell battery power system of claim 2, further comprising battery charging means for recharging said battery means, said battery charging means being responsive to said system power control means.

12. The multicell battery power system of claim 11, wherein said battery charging means draws power from said power bus means.

13. The multicell battery power system of claim 2, further comprising battery charging means for recharging said battery means, said battery charging means being responsive to said battery control means.

14. The multicell battery power system of claim 13, wherein said battery charging means draws power from said power bus means.

15. The multicell battery power system of claim 1, wherein said battery power monitoring means comprises a DC voltage level sensor.

16. The multicell battery power system of claim 1, further comprising a power source coupled to said power bus means, wherein said power bus means is further for transmitting power between said power source and said battery modules.

17. The multicell battery power system of claim 1, wherein said battery power monitoring means is further for monitoring the power level of said power bus means.

18. A multicell battery power system for providing power to a load comprising:
   a plurality of battery modules; and
   power bus means for transmitting power between said battery modules and the load;
   wherein each said battery module comprises a battery means for providing electrical power, a connection means for selectively coupling said battery means directly to the power bus means, a sensing circuit for detecting the value of a parameter related to the operation of said battery module, and a microprocessor for controlling the operation of said connection means in accordance with a predetermined program specifying when said battery means should be connected to said power bus means as a function of the value of said parameter.

* * * * *